US009518665B2

(12) United States Patent
Hansen, III

(10) Patent No.: US 9,518,665 B2
(45) Date of Patent: Dec. 13, 2016

(54) BALL VALVE FOR COLD FLUIDS

(71) Applicant: Charles C. Hansen, III, LaGrange Park, IL (US)

(72) Inventor: Charles C. Hansen, III, LaGrange Park, IL (US)

(73) Assignee: HANTEMP CORPORATION, Westmont, IL (US)

( * ) Notice: Subject to any disclaimer, the term of this patent is extended or adjusted under 35 U.S.C. 154(b) by 104 days.

(21) Appl. No.: 14/540,833

(22) Filed: Nov. 13, 2014

(65) Prior Publication Data
US 2015/0129788 A1 May 14, 2015

Related U.S. Application Data

(60) Provisional application No. 61/904,309, filed on Nov. 14, 2013.

(51) Int. Cl.
*F16K 5/06* (2006.01)
*F16K 35/06* (2006.01)
*F16K 5/12* (2006.01)

(52) U.S. Cl.
CPC ............ *F16K 5/0689* (2013.01); *F16K 5/0605* (2013.01); *F16K 5/0647* (2013.01); *F16K 5/12* (2013.01); *F16K 35/06* (2013.01)

(58) Field of Classification Search
CPC .... F16K 5/0689; F16K 5/0694; F16K 5/0605; F16K 5/0647; F16K 5/205; F16K 41/026; F16K 31/502

(Continued)

(56) References Cited

U.S. PATENT DOCUMENTS 2,218,886 A * 10/1940 Krause .................. H01J 9/50
137/327
4,911,408 A * 3/1990 Kemp .................. F16K 5/0689
251/174

(Continued)

FOREIGN PATENT DOCUMENTS

DE       EP 0112977 A1 *  7/1984 .......... F16K 5/0605
DE       102012223281 A1 *  6/2014 .......... F16K 5/0689

OTHER PUBLICATIONS

Machine Translation for DE 102012223281 A1.*

(Continued)

*Primary Examiner* — Mary McManmon
*Assistant Examiner* — Ian Paquette
(74) *Attorney, Agent, or Firm* — Vedder Price P.C.

(57) ABSTRACT

A ball valve including upstream and downstream seats and a ball having a flow opening disposed between the upstream and downstream seats. A flow path is defined through the valve only when the ball is disposed in an open position. In one embodiment, when the ball is disposed in a closed position the upstream seat may intermittently disengage from the ball to relieve hydrostatic expansion of a liquid within the ball resulting an increased pressure that is greater than a pressure within a body cavity of the valve outside the ball. In another embodiment, a distance between the upstream and downstream seats is greater than an outer diameter of the ball and the ball engages only one of the upstream and downstream seats when disposed in the closed position and a pressure differential is defined between the upstream and downstream seats. The upstream and downstream seats may each include a partially spherical sealing surface that may have a crenulate configuration.

30 Claims, 15 Drawing Sheets

(58) Field of Classification Search
USPC .......................... 251/148, 150, 214, 315.01, 315.07,251/315.1, 315.16, 172, 174, 181
See application file for complete search history.

(56) References Cited

U.S. PATENT DOCUMENTS

| | | | | |
|---|---|---|---|---|
| 4,955,581 | A * | 9/1990 | Dukas, Jr. ............... | F16K 41/10 251/214 |
| 5,524,863 | A * | 6/1996 | Davis ....................... | B08B 9/00 137/625.32 |
| 2002/0162984 | A1* | 11/2002 | Rosas ................. | F16L 19/0218 251/148 |
| 2002/0185625 | A1* | 12/2002 | Gosling ................. | F16K 5/201 251/315.01 |
| 2008/0128648 | A1* | 6/2008 | Thomas ................ | F16K 5/0642 251/315.01 |
| 2013/0313457 | A1* | 11/2013 | Avdjian ............... | F16K 5/0626 251/172 |
| 2015/0300508 | A1* | 10/2015 | He ....................... | F16K 5/0678 251/314 |

OTHER PUBLICATIONS

Machine Translation for EP 0112977 A1.*
Beasley, Marvin E., "Bidirectional sealing ball valves in power applications," Oct. 2013, pp. 67-71, retrieved from www.valveworld.net.
Swagelok, "Ball Valves: General Purpose and Special Application," Nov. 2013, 36 pages, retrieved from www.swagelok.com.

* cited by examiner

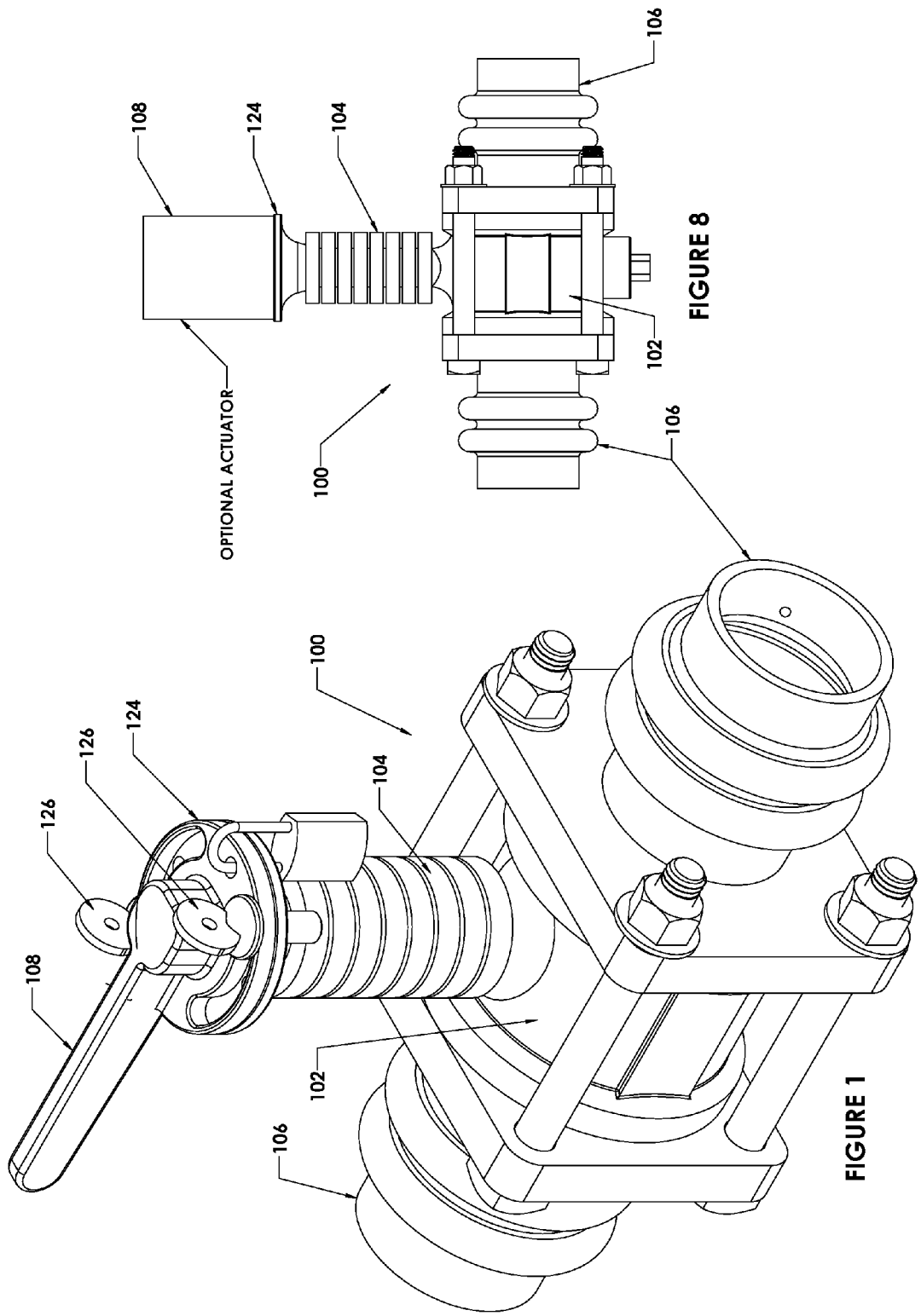

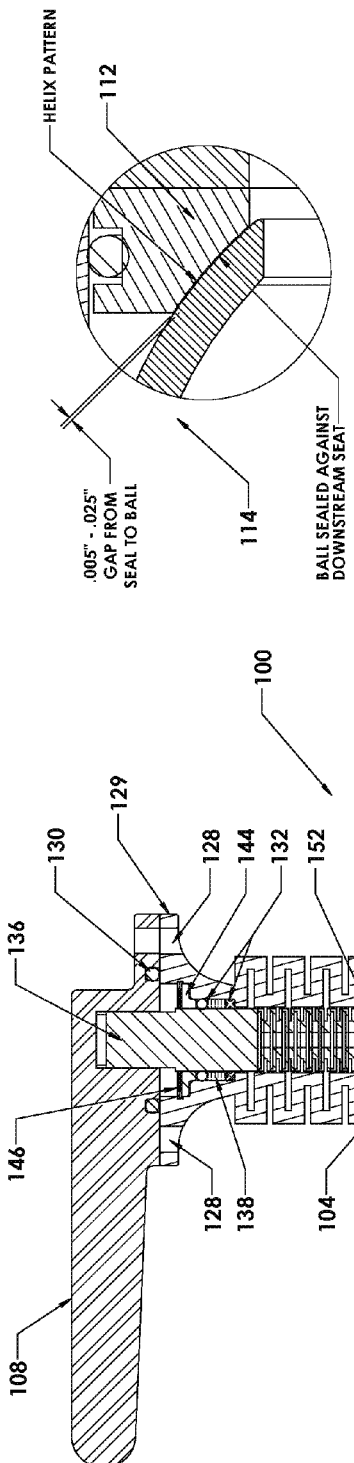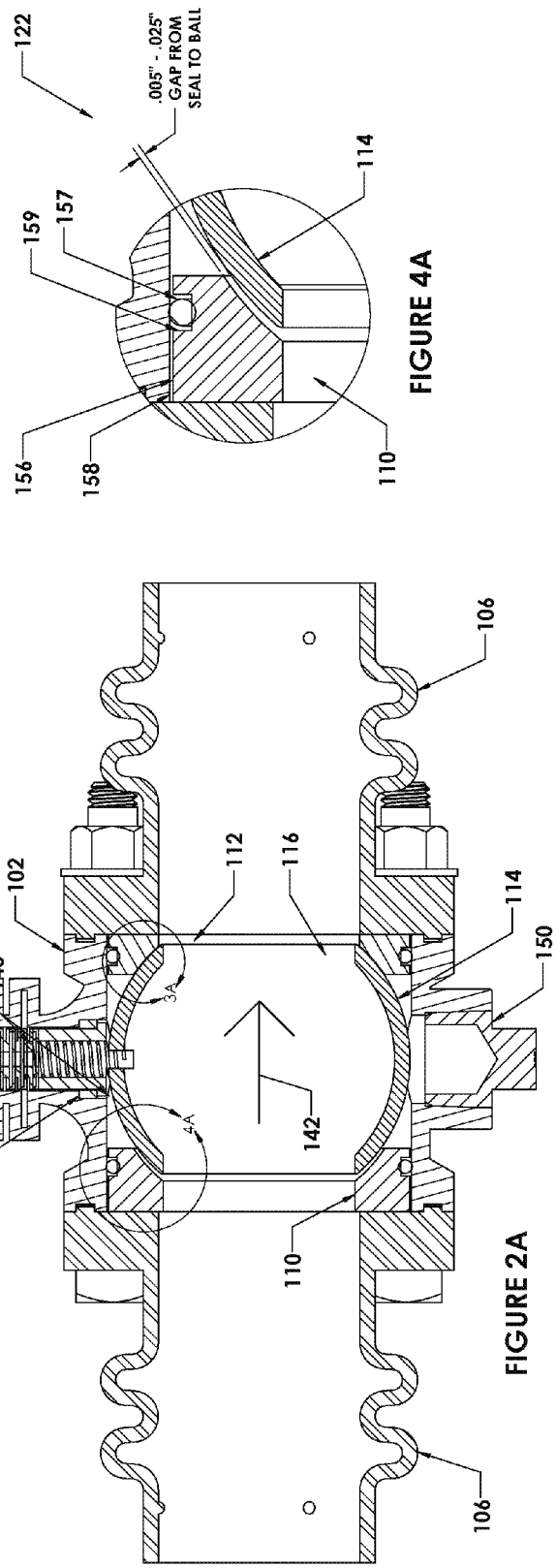

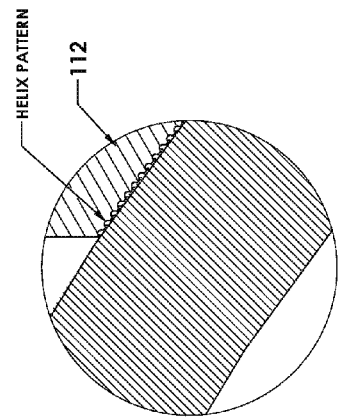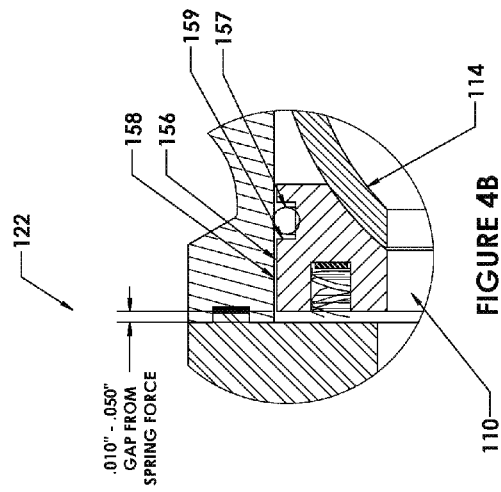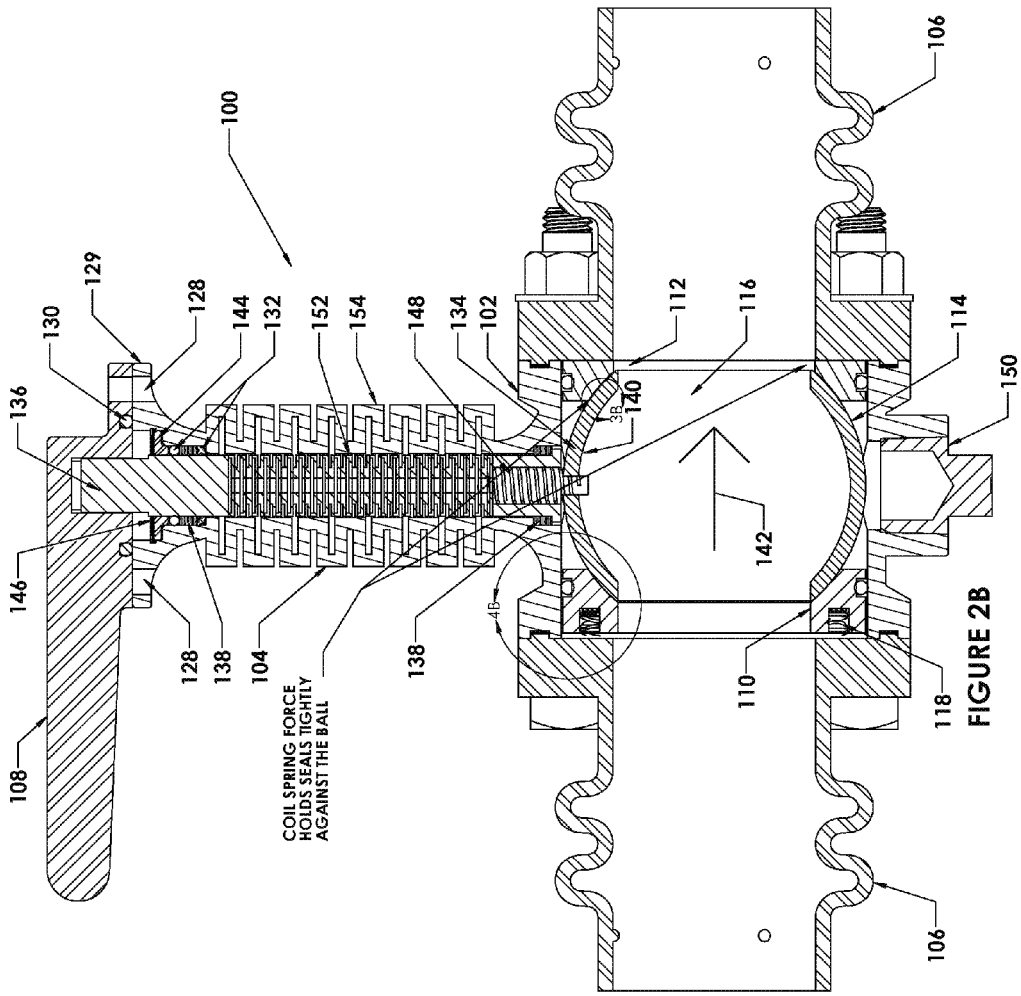

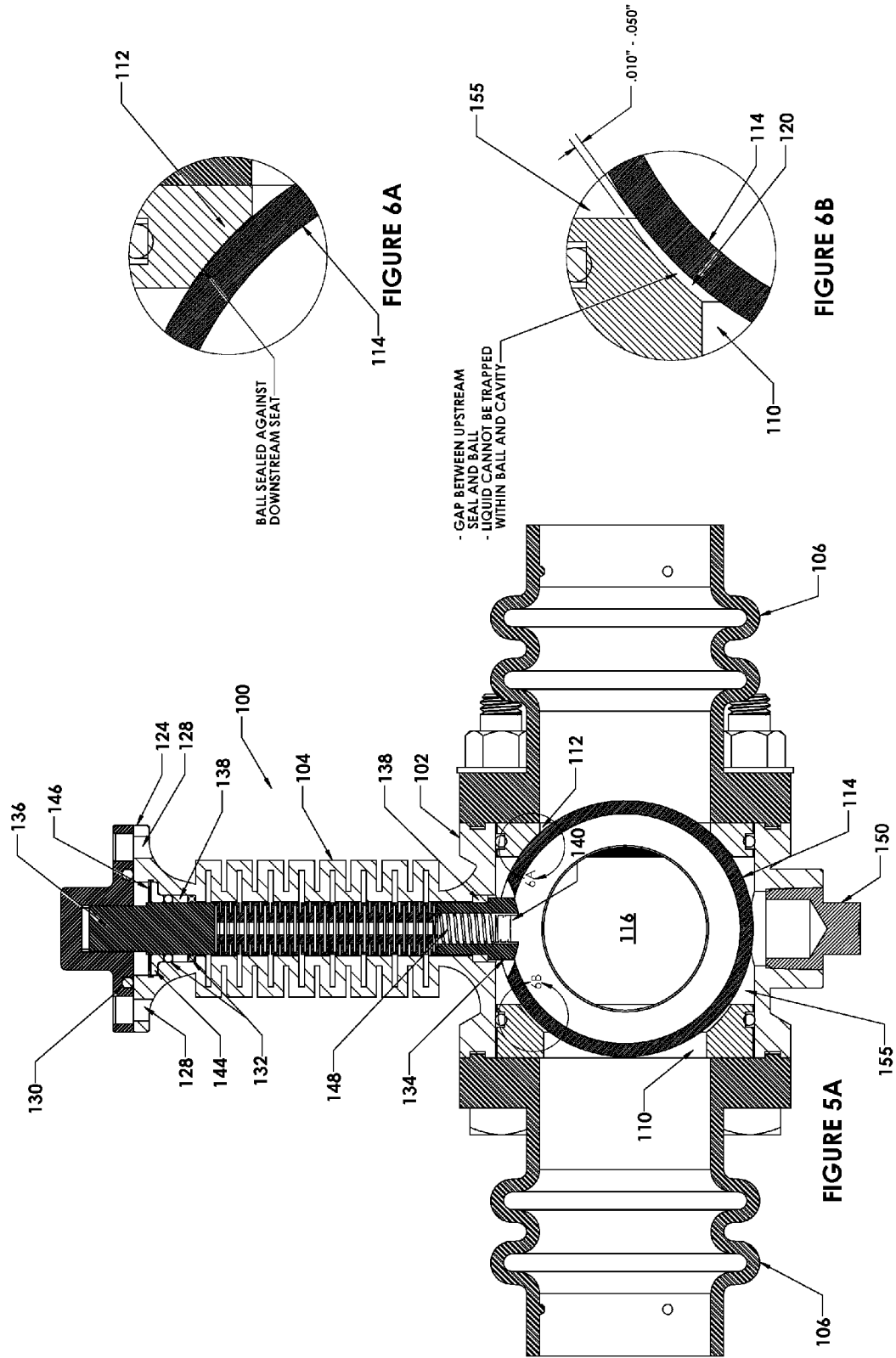

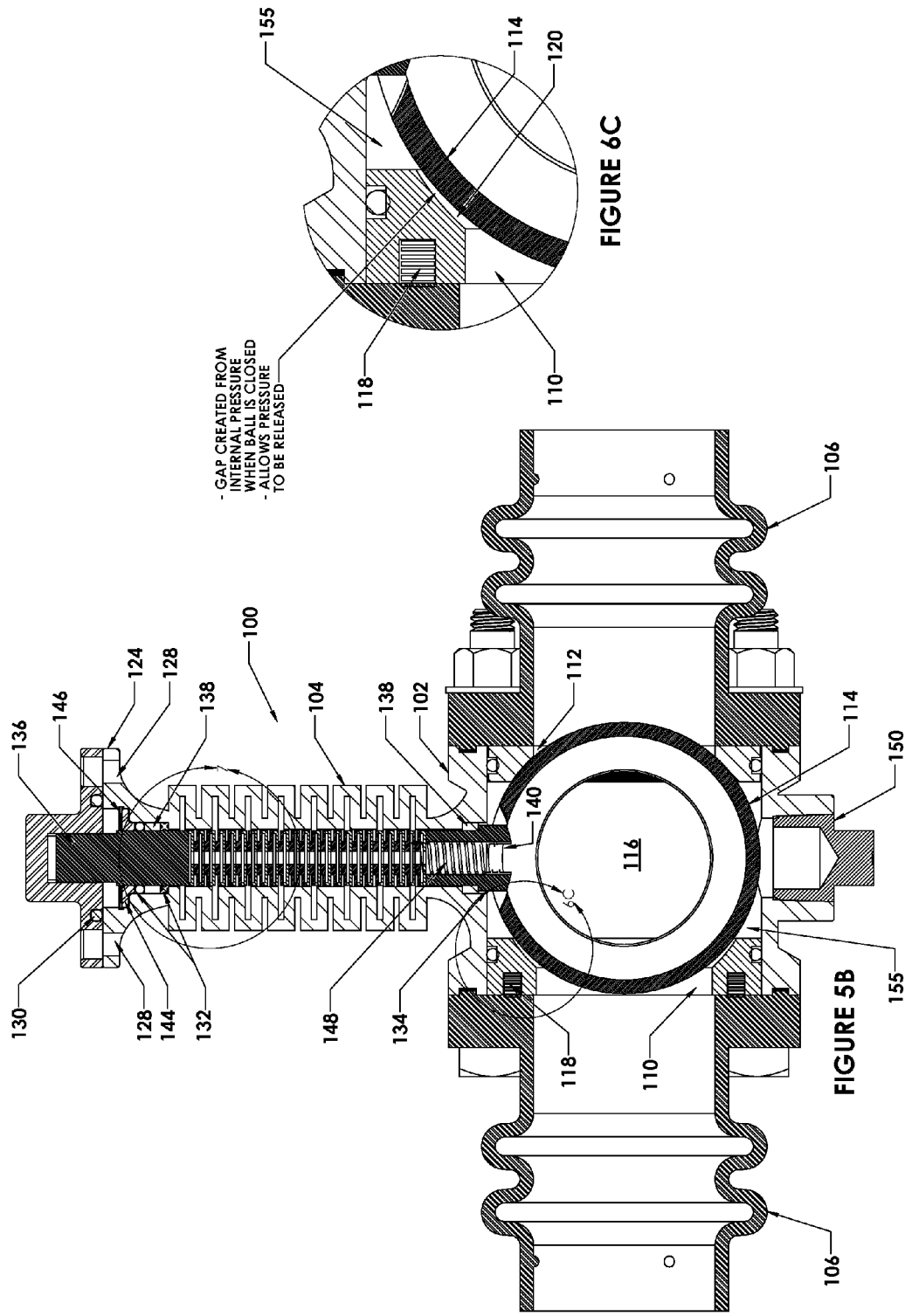

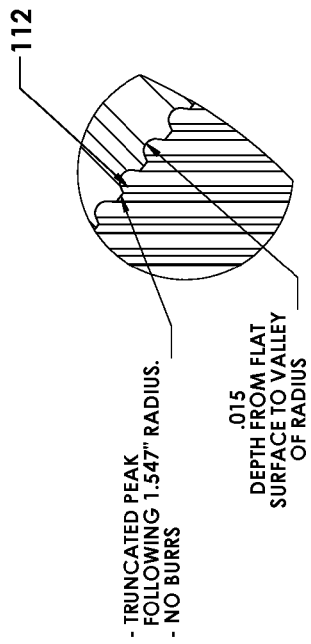
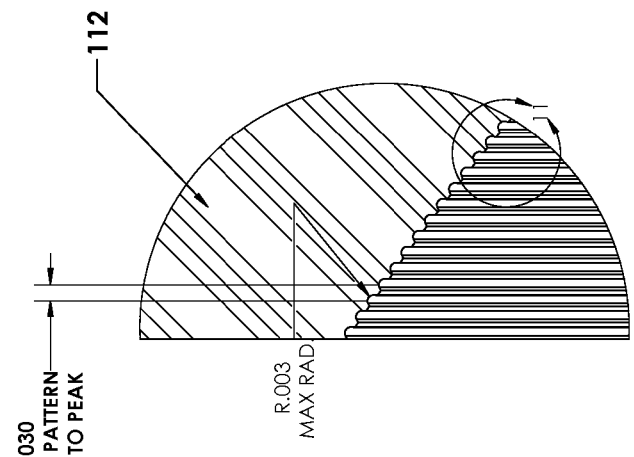
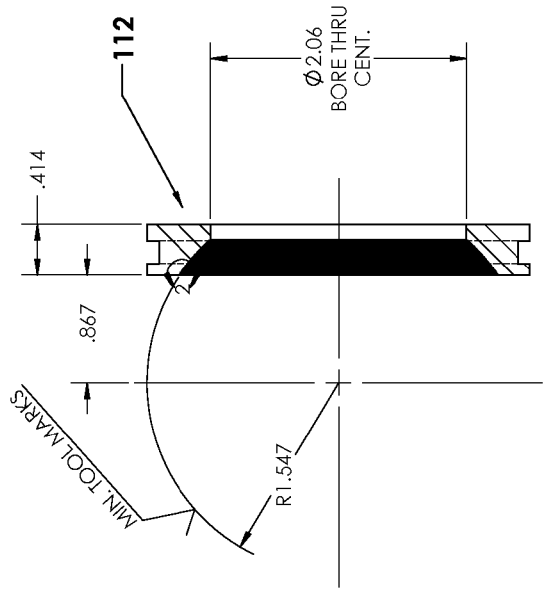
Figure 11
Figure 10
Figure 9

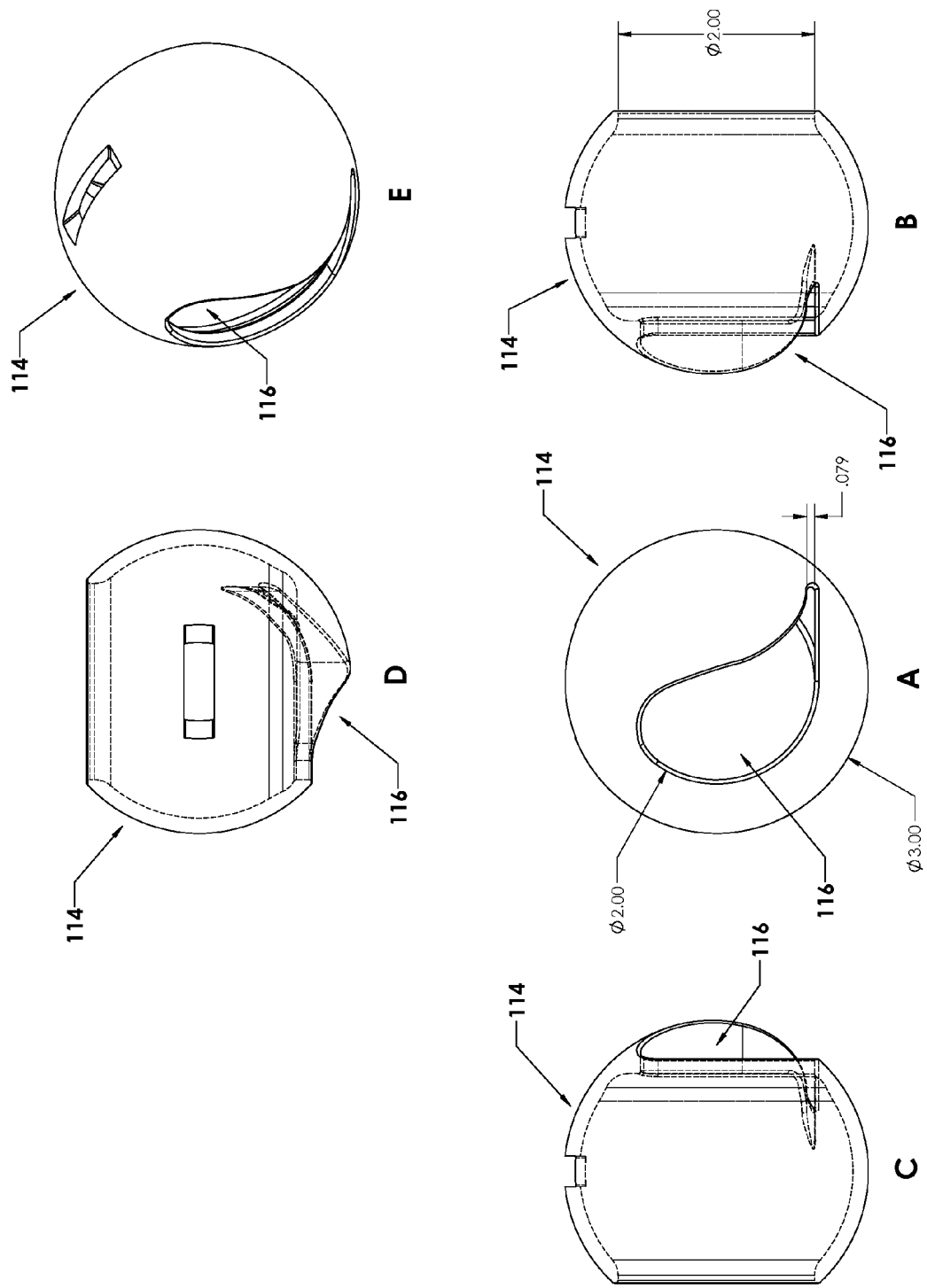
Figure 12, A-E

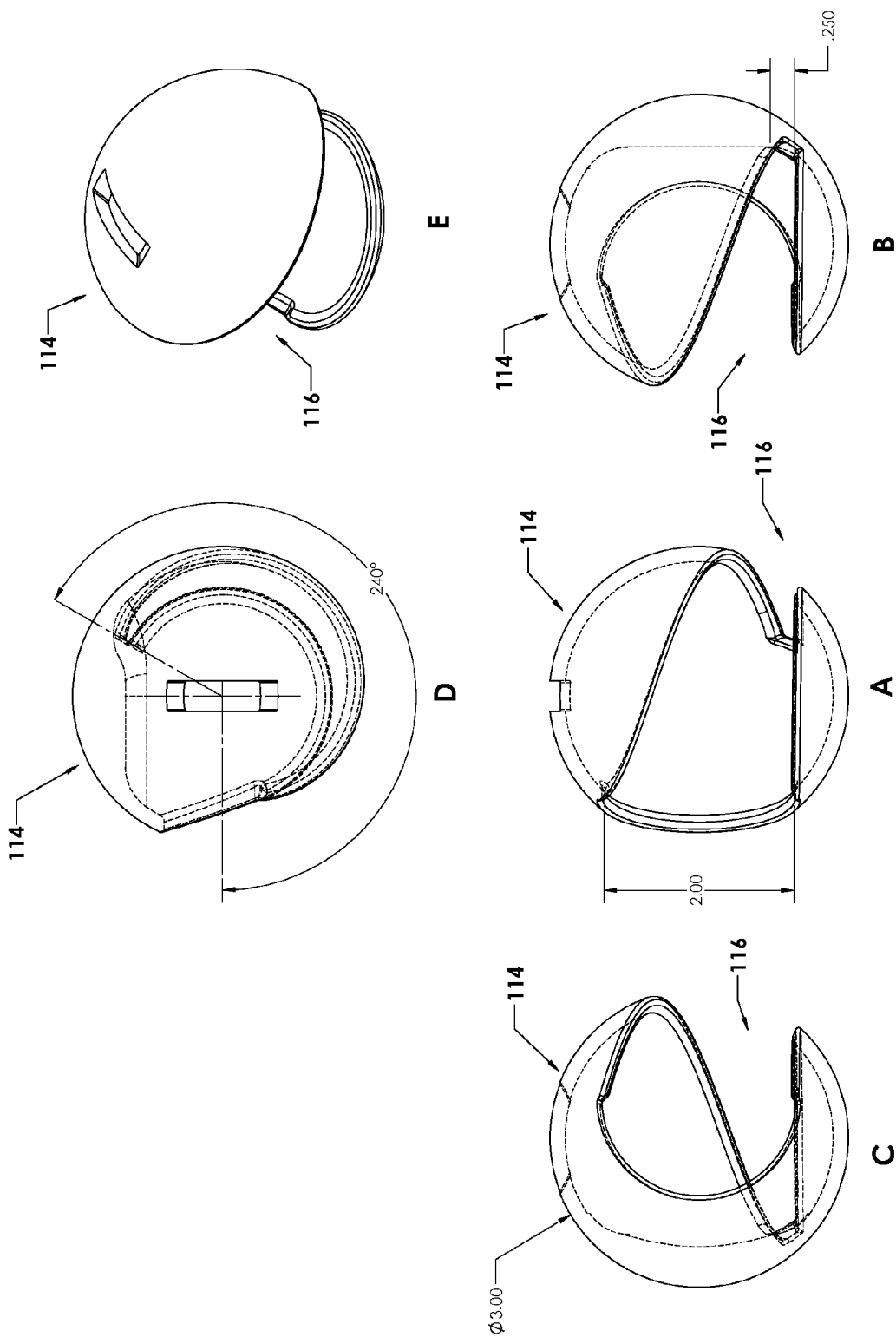
Figure 13, A-E

THE STEM CAN BE CONSTRUCTED USING 3-LEGGED STOOL SECTIONS SOLDERED OR WELDED TOGETHER LINEARLY WITH LEG POSITIONS ROTATED 60 DEGREES EVERY OTHER SECTION THROUGHOUT THE LENGTH OF THE STEM.

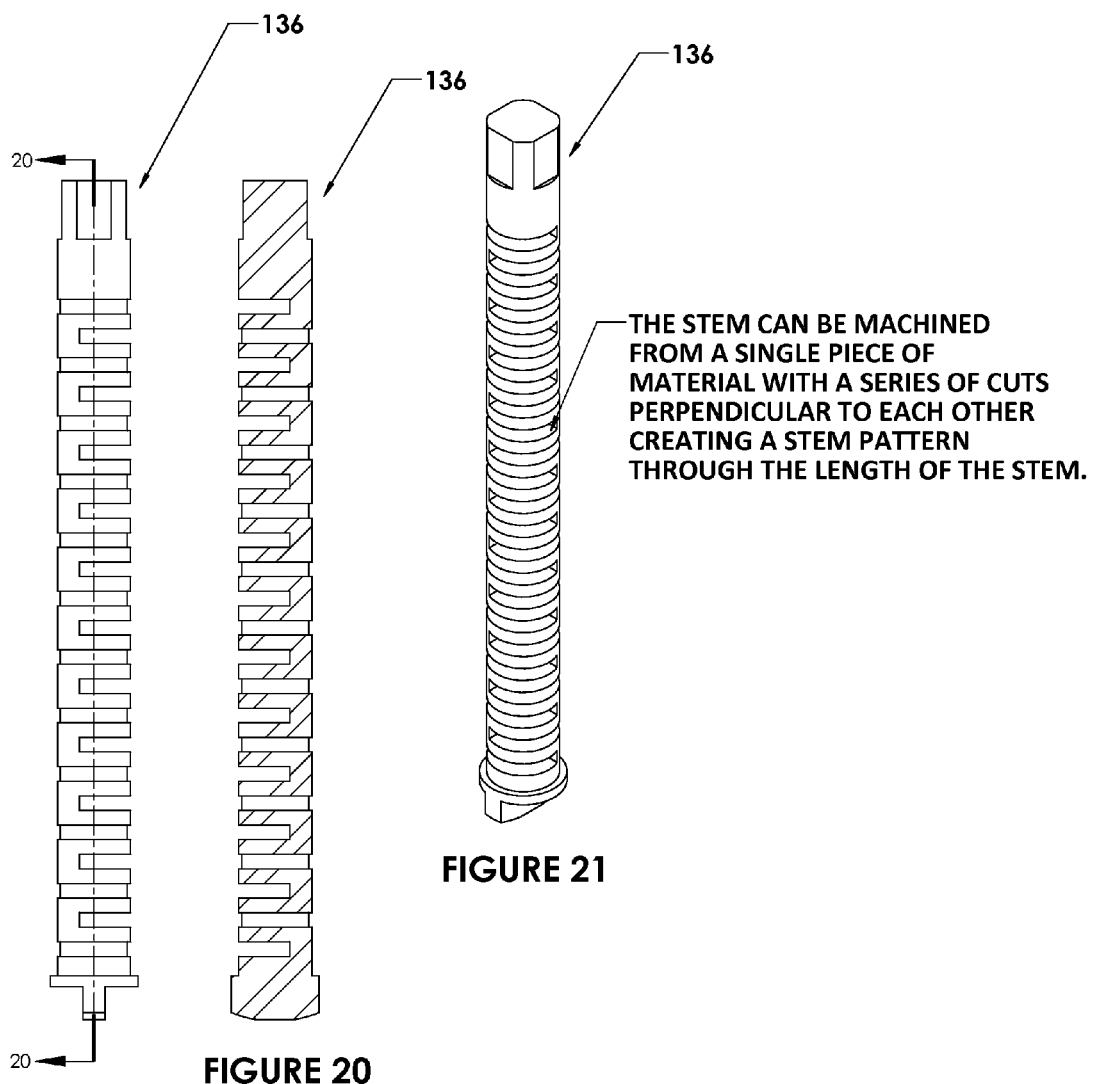

THE STEM CAN UTILIZE A MACHINED SPRING TO FORM THE CORREGATED EXTERIOR SURFACE AND A SIMILAR LENGTHY HEAT PATH.

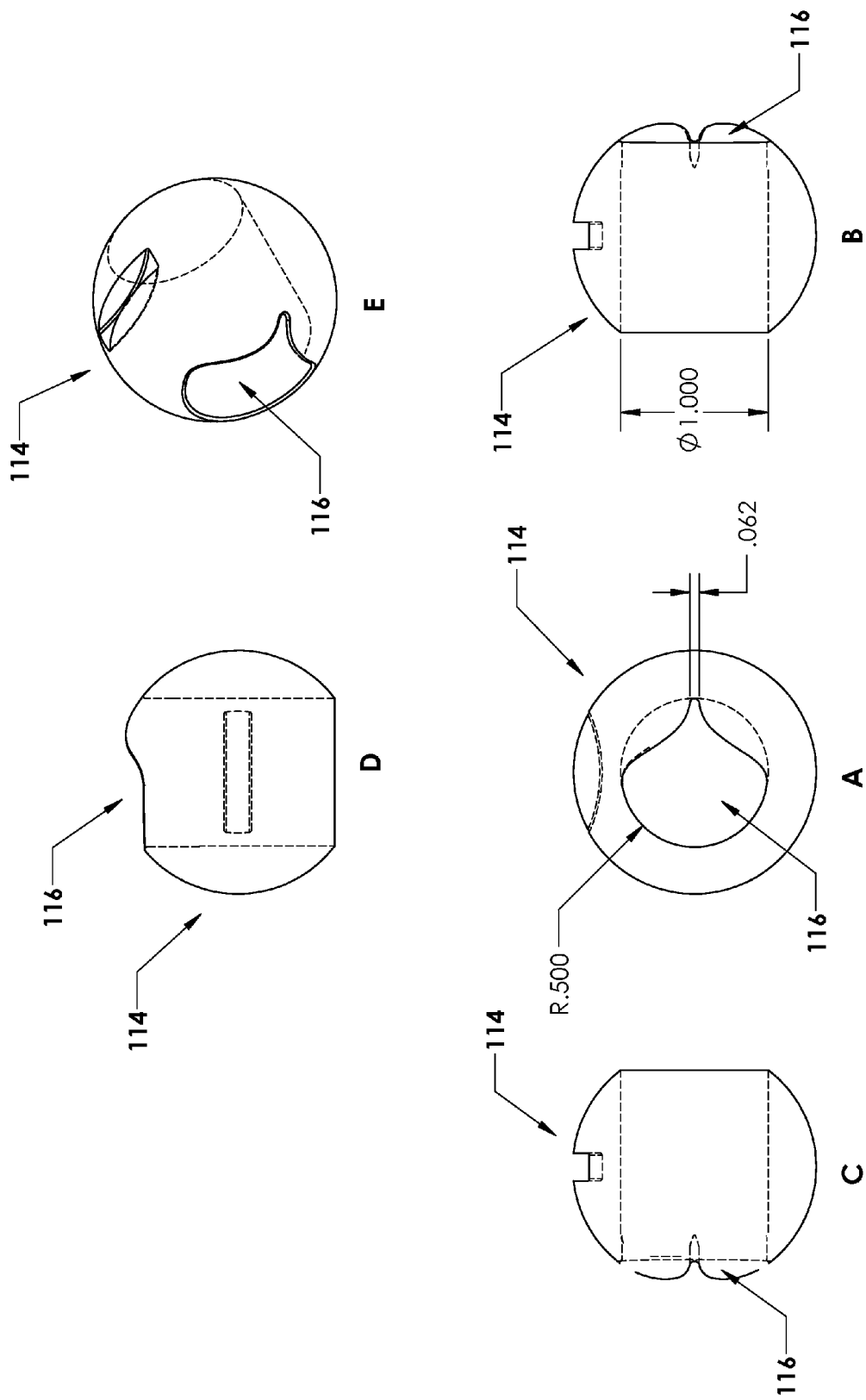
FIGURE 25, A-E

BALL VALVE FOR COLD FLUIDS

The present utility patent application claims priority from and the benefit of U.S. Provisional Patent Application No. 61/904,309, filed Nov. 14, 2013, entitled BALL VALVE FOR COLD FLUIDS, the contents of which is hereby incorporated by reference in its entirety.

FIELD OF THE DISCLOSURE

The present disclosure generally relates to ball valves. More particularly, the present disclosure relates to an improved ball valve including reduced operating friction, near-zero shut-off leakage, reduced heat transfer to stem and stem housing or bonnet, safe accommodation for hydrostatic expansion, replaceable stem seals when the valve is under pressure and a unique upstream and downstream ball seal ring, washer or seat.

BACKGROUND

Ball valves of various designs are widely used in business and industry for controlling substances like water, brines, and petrochemical, air, gasses, and all types of fluids at various temperatures and pressures. These valves typically are made of various suitable materials, such as brass, iron, steel, stainless steel and other metals and also frequently made of plastic. Most are manually controlled by various handles connected to a protruding valve stem that can be rotated to move the directly connected ball, at a lowest end of the stem, from a fully open orientation to a fully closed orientation and back to a fully open orientation or at any various angle open orientation in-between. In some cases, instead of handle-operated or wrench-operated stems some ball valves may be operated by an electric, air or hydraulic powered actuator motor, which is mounted on the valve and directly connected to the valve stem in order to open, close, or modulate the ball valve.

In manually-operated ball valves, it is important to have a virtually leak proof stem seal design to prevent fluid leakage to the atmosphere. This is usually achieved by use of a conventional stem packing gland whose flexible packing material can be tightened or loosened in response to rotation of a threaded gland packing nut. In some cases a non-adjustable gland is used which employs a spring for consistent gland loading, the spring may be a wave spring or conventional coiled wire compression spring.

It is necessary to use sufficient force on the packing to squeeze it enough to achieve leak tightness between the inner diameter of the packing and the outer diameter of the rotating valve stem, as well as the non-rotating sealing of the outer diameter of the packing to the valve body stem housing or bonnet bore. As valve body and fluid temperatures change, the packing tends to expand or to contract in response thereto thereby encouraging stem leakage. In order to ensure a leak tight condition, the adjustable or non-adjustable packing is typically excessively tightened, which thereby results in increased friction against the valve stem and consequently the need for higher torque to rotate the stem in the packing, which in turn requires components to accommodate such higher torque requirements.

In the case of a manually rotating stem using a handle or an operating wrench such resulting high rotational torques requirement can be overcome by using the operator's hand, arm and/or or body to apply more torque. However, when a motor operator is used for such a ball valve, the motor must be oversized to achieve the high torque required to rotate the stem in the tightened packing conditions. Further, most ball valves use handles which exert a side thrust on the valve stem as rotation is accomplished against the opposing torque from friction of the stem packing and the valve seal washer. This side thrust causes friction between the valve stem and the bore in the valve body stem bonnet, which results in greater torque being required to move the ball, especially when the stem is longer than a mere inch or so out of the valve body.

Most ball valves have a washer-shaped ball seal on each side of the ball. To achieve leak-free tightness when the ball is closed and the ball opening is cross-wise to the valve body and outlet connection, it is necessary for the contact between the ball seal washer and the ball to be narrow and leak-tight and also necessary for the ball seal washers to be held against the ball surface with substantial force to prevent leakage.

In response to such high force and the resulting friction, a substantial increased amount of torque is required to turn the valve stem. In addition to the basic torque needed for an empty and idle ball valve, additional torque is needed to turn a closed ball valve having high pressure difference of 200 psi from inlet to outlet, for example. In summary, the operation torque of most ball valves is relatively high because of the force of inlet ball seal washer on ball plus the force of the outlet ball seal washer on ball, plus stem packing friction, plus side thrust friction on stem bearing surface.

Most ball valves seal around the ball by squeezing the apertured ball between two washer-like round plastic seating surfaces. When the ball aperture lines up the center axis of the ball seal washer seats, flow can occur from the ball valve body inlet through the inlet washer-seat hole, through the ball aperture hole, through the outlet washer seat hole and through the valve body outlet. When the ball aperture is rotated approximately 90 degrees by the valve stem, the ball aperture is no longer in alignment with the washer seal hole so any valve flow leakage can only occur along the solid ball surface. Since this surface is sealed against the ball seal washer seat semi-spherical surface, flow cannot occur past either the inlet washer seal or the outlet washer seal, therefore halting any flow through the valve body. Unfortunately, there is fluid trapped within the ball aperture area within the valve body that is subject to temperature change, causing volume and pressure changes, which in the case of trapped liquid, can damage the ball seal washer seats and even valve body and stem packing because of the very large bulk modulus expansion factor characteristic of a warming liquid. To avoid this, conventionally a small one millimeter or so hole is drilled through the ball center to the ball exterior at right angle to ball hole aperture and toward the upstream inlet valve opening. This overcomes bulk expansion problems but creates a valve which is not leak tight and vents the liquid to the inlet pipe of the valve, which may be very detrimental to operators or to the system. Other methods such as a tiny spring loaded relief valve are sometimes built into the valve to permit bulk modulus expansion relief, with the same disadvantages.

The common two-way shut-off ball valve uses a valve body surrounding the ball and has a pipe connection or flange connection at the valve inlet and outlet. For closed refrigeration systems, the ball valves are used to control flow of high pressure liquid from the condenser, hot gas to the condenser, hot gas from the compressor, cold gas from the evaporator to the compressor, cold pressure liquid from the accumulator to the evaporator, cold static liquid or gas between an accumulator and an evaporator, cold secondary refrigerants liquid, warm condenser liquids, and various lubricating oil circuits. In the case of cryogenic systems, the ball valve and control flow of cold liquid or gases in various circuits at flow temperatures of about −100° F. or less. For many applications, the ball valve requires insulation thickness greater than 2" to prevent heat loss and exterior frosting or moisture condensation on the exterior surfaces of the valve body and its stem and stem housing or bonnet. Present ball valve bonnets and stems would be totally buried by such thick insulation. Alternatively, the valve stem may extend a greater distance away from the valve body (e.g. at least 18-24") in an attempt to overcome the frosting problem. However, conventional attempts drastically increase the costs to produce and without overcoming other disadvantages described above.

Therefore, there is a need in the art for ball valves that are operable at low turning torque; that are easily converted from manual to motorized or vice versa; that do not trap liquid within the ball and cavity or safely accommodate any trapped liquid; that do not chill the exterior of the valve stem or stem housing to an extent that these valve portions would create exterior frosting or moisture condensing temperatures; that provide leak tight seating of the ball with a unique ball seal washer seat and that can be welded into piping without the need for body chilling to prevent plastic seat high temperature damage; and that provide a handle which can be locked into position and statically sealed to further prevent stem packing leakage.

BRIEF DESCRIPTION OF THE DRAWINGS

The disclosure will be more readily understood in view of the following description when accompanied by the below figures and wherein like reference numerals represent the elements, wherein:

FIG. 1 illustrates a perspective view of one embodiment of a ball valve of the present disclosure.

FIG. 2A illustrates a cross-section view of the ball valve of FIG. 1 in an open orientation including one embodiment of upstream and downstream seats.

FIG. 2B illustrates a cross-section view of the ball valve of FIG. 1 in an open orientation including another embodiment of upstream and downstream seats.

FIG. 3A illustrates an enlarged detail view of a portion of the ball valve of FIG. 1 highlighted in FIG. 2A.

FIG. 3B illustrates an enlarged detail view of a portion of the ball valve of FIG. 1 highlighted in FIG. 2B.

FIG. 4A illustrates an enlarged detail view of a portion of the ball valve of FIG. 1 highlighted in FIG. 2A.

FIG. 4B illustrates an enlarged detail view of a portion of the ball valve of FIG. 1 highlighted in FIG. 2B.

FIG. 5A illustrates a cross-section view of the ball valve of FIG. 1 in a closed orientation including one embodiment of upstream and downstream seats.

FIG. 5B illustrates a cross-section view of the ball valve of FIG. 1 in a closed orientation including another embodiment of upstream and downstream seats.

FIG. 6A illustrates an enlarged detail view of a portion of the ball valve of FIG. 1 highlighted in FIG. 5A.

FIG. 6B illustrates an enlarged detail view of a portion of the ball valve of FIG. 1 highlighted in FIG. 5A.

FIG. 6C illustrates an enlarged detail view of a portion of the ball valve of FIG. 1 highlighted in FIG. 5B.

FIG. 8 illustrates a perspective view of another embodiment of a ball valve of the present disclosure.

FIG. 9 illustrates a cross-section view of an embodiment of a ball seal washer of the present disclosure.

FIG. 10 illustrates an enlarged detail view of a portion of the ball seal washer of FIG. 9 highlighted in FIG. 9.

FIG. 11 illustrates an enlarged detail view of a portion of the ball seal washer of FIG. 10 highlighted in FIG. 10.

FIG. 12 A-E illustrate various views of another embodiment of a ball valve of the present disclosure.

FIG. 13 A-E illustrate various views of another embodiment of a ball valve of the present disclosure.

FIGS. 19-21 illustrate various views of another embodiment of the stem for a ball valve of the present disclosure.

FIG. 25 A-E illustrate various views of another embodiment of a ball valve of the present disclosure.

DETAILED DESCRIPTION OF THE PREFERRED EMBODIMENTS

Figure 7:
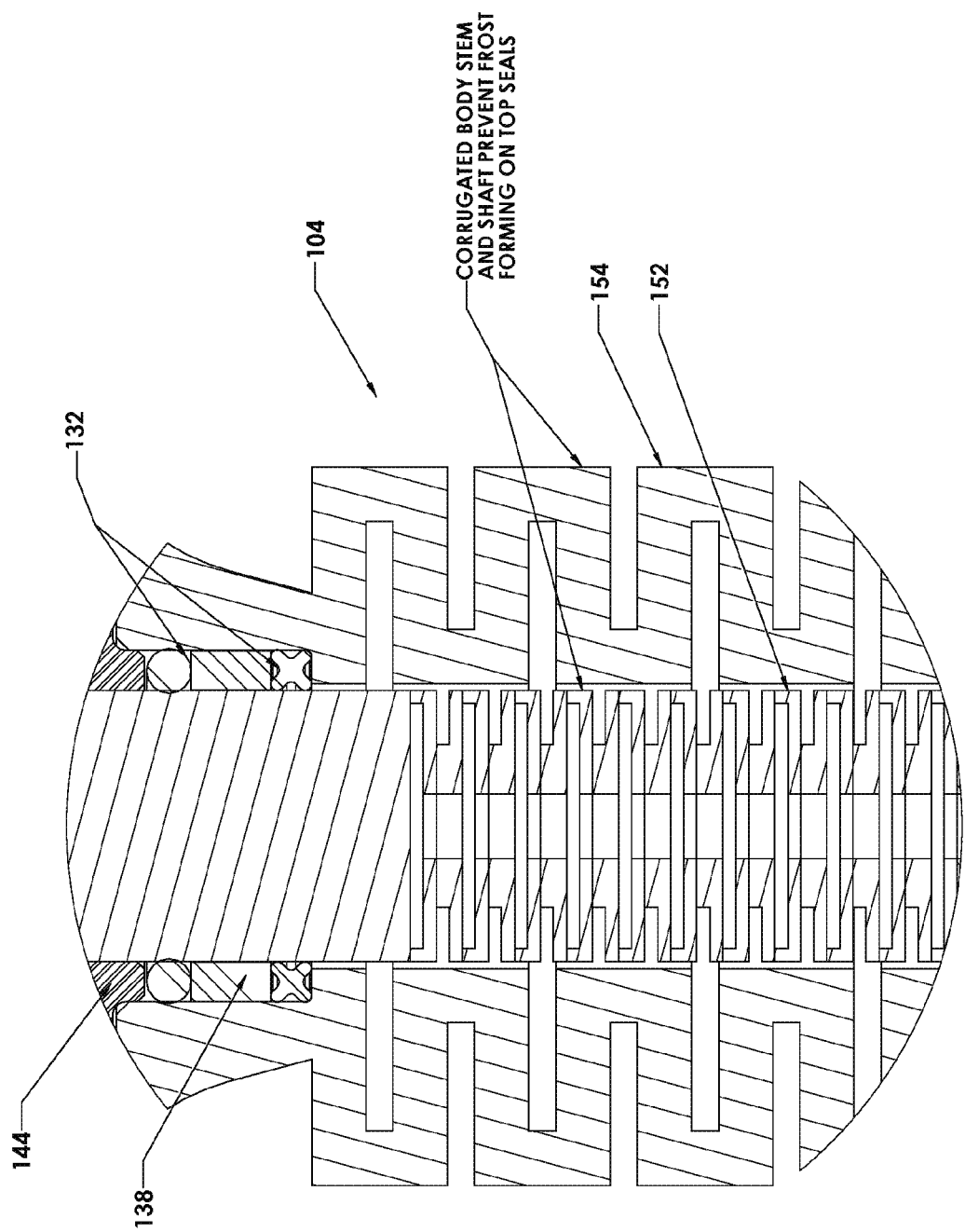
FIG. 7 illustrates an enlarged detail view of a portion of the ball valve of FIG. 1 highlighted in FIG. 5B.

The following description of the embodiments is merely exemplary in nature and is in no way intended to limit the disclosure, its application, or uses. In one embodiment of the present disclosure, the ball valves as disclosed may be useful in connection with low temperature fluids in the approximate range of −40° F. for low temperature frozen food storage to −200° F. or less for near-cryogenic or cryogenic applications involving reduced resistance electrical transmission, medical research, special surgery, liquefying of gaseous fuels, alteration of materials properties, and similar lower temperature activities. It is within the teachings of the present disclosure that the ball valves described herein are further useful in connection with other fluids above the temperature of −40 degrees F.

Generally, a ball valve as disclosed herein may include upstream and downstream seats and a ball disposed between the upstream and downstream seats that has a flow opening. A flow path may be defined through the valve only when the ball is disposed in an open position. In one embodiment, when the ball is disposed in a closed position the upstream seat may intermittently disengage from the ball to relieve hydrostatic expansion of a liquid within the ball resulting an increased pressure that is greater than a pressure within a body cavity of the valve outside the ball. In another embodiment, a distance between the upstream and downstream seats is greater than an outer diameter of the ball and the ball engages only one of the upstream and downstream seats when disposed in the closed position and a pressure differential is defined between the upstream and downstream seats. The upstream and downstream seats may each include a partially spherical sealing surface that may have a crenulate configuration.

In one aspect of the present disclosure, a valve may include a body including a bore, an upstream seat that defines an inlet opening, a downstream seat that defines an outlet opening, and a ball having a flow opening and disposed between the upstream and downstream seats. The ball is movable within the body between a closed position and an open position, such that a flow path is defined through the body only when the ball is disposed in the open position. When the ball is disposed in the closed position the upstream seat intermittently disengages from the ball when a pressure within the inlet opening is greater than a pressure within the body cavity outside the ball. The upstream and downstream seats may each include a partially spherical sealing surface that may have a crenulate configuration.

In other aspects of the present disclosure, the crenulate configuration may be defined by a truncated peak and a valley that may be selected from a group consisting of a series of independently formed truncated peaks and valleys and a single continuous spiraling truncated peak and valley; a distance between the upstream and downstream seats is greater than an outer diameter of the ball, when the ball is disposed in the closed position; the flow opening is a singular opening in the ball that may be defined over more than 90° of a circumference of the ball; the flow opening may be defined by a periphery that is configured such that a lower area of the flow opening is greater than an upper area of the flow opening; and the flow opening may be defined by a periphery that is configured such that approximately 25% of a lower area of the flow opening is exposed when the ball is moved from the closed position to the open position to define a flow path through the ball before any of an upper area of the flow opening is exposed.

In other aspects of the present disclosure, stem housing may be connected to the body and have a corrugated exterior surface configuration and a corrugated interior surface configuration; a stem may be disposed within the stem housing that engages the ball, and includes a shoulder having an outer diameter greater than an inner diameter of the stem housing that is disposed adjacent the ball to sealingly engage the stem housing; a biasing element may be disposed between the ball and the stem that biases the stem into sealing engagement with the stem housing; a seal assembly may be disposed within the stem housing about an end portion of the stem opposite the ball that includes a seal ring that is replaceable when a pressure is present within the body; the stem may include a reduced cross sectional area configuration; the reduced cross sectional area configuration may be selected from a group consisting of a corrugated exterior surface, a series of longitudinally alternating grooves, a series of connected discs, a spring, and a series of longitudinally spirally offset grooves; and a piping connection may be connected to the body adjacent one of the inlet and outlet openings that has a wall having a corrugated configuration.

In another aspect of the present disclosure, a valve may include a body including an upstream seat that defines an inlet opening, a downstream seat that defines an outlet opening, and a ball having a flow opening disposed between the upstream and downstream seats. The ball is movable between a closed position and an open position such that a flow path is defined through the body only when the ball is disposed in the open position. A distance between the upstream and downstream seats is greater than an outer diameter of the ball, such that the ball engages only one of the upstream and downstream seats when disposed in the closed position and a pressure differential is defined between the upstream seat and the downstream seat. The upstream and downstream seats may each include a partially spherical sealing surface that has a crenulate configuration. The ball may engage neither the upstream nor the downstream seats when the ball is disposed in the open position.

Generally, as shown in FIGS. 1-13, a ball valve 100 in accordance with any of the potential embodiments or teachings of the present disclosure are unique because the structure provides a low-friction, near-zero shut-off leakage flow functionality and otherwise overcomes the disadvantages of the prior art. The ball valve 100 may include a body 102 having a stem housing or bonnet 104 extending therefrom and piping connections 106 connected thereto. Preferably, the stem housing 104 has length of approximately 6-8 inches. A handle or actuator 108 may be connected to a stem within the bonnet or housing 104 to actuate the ball as described herein and as generally conventionally known.

As shown in FIGS. 2 and 5, in one embodiment of the present disclosure, the body 102 may include a bore 103 and a pair of seal rings or ball seal washer seats 110 (disposed on the inlet or upstream side of the ball 114, to define an inlet opening 111) and 112 (disposed on the outlet or downstream side 112 of the ball 114, to define an outlet opening 113). The ball 114 generally has a hardened spherical configuration with an exterior surface that is very smooth and a flow opening 116, which may be a pair or openings (i.e., inlet and outlet) or a singular opening as further described herein. The ball 114 is disposed within the bore 103 between the upstream and downstream seats 110, 112 and is moveable within the body 102 between a closed position (see, FIG. 5) and an open position (i.e., any position other than the closed position where the flow opening 116 is exposed to the outlet opening 113, which is when the ball 114 is moved from the closed position such that a fluid adjacent the upstream seat 110 or inlet opening 111 having a pressure that is greater than the fluid or lack thereof adjacent the downstream seat 112 or outlet opening 113 (i.e., a pressure differential) moves through the revealed portion of the flow opening 116 that is disposed within the outlet opening 113, for example, see, FIG. 2) such that a flow path 142 is defined through the body 102 only when the ball 114 is disposed in the open position.

Preferably, in accordance with one embodiment of the present disclosure, as shown in FIGS. 2-6 and 9-11, the seal ring or ball seal washer seat on the downstream side 112 of the ball 114 has a concave partially spherical sealing surface that may be formed of a Teflon®, polyurethane, babbitt metal, plastic coated metal or the like similar material that is suitable for the intended functionality. The seat 112 preferably has a desirable section of such partially spherical sealing surface as necessary to perform the intended functionality. In one embodiment, such downstream seat 112 may have a crenulate configuration that may be described as a wave, trough-and-peak, crenate, crenellated, toothed, truncated peak and valley, undulating, sinuate, undulatory, sinusoidal, snaky, anguine, anguilliform or the like similar other shaped surface that in one embodiment may be approximately about 0.015 inches in height and width and machined as concentric circles or as a continuous spiral. It is within the teachings of this disclosure that the shaped surface or grooves may vary in any dimension, material, characteristic and configuration to facilitate or achieve the intended functionality as described herein. In one embodiment, the shaped surface or grooves of the spherical mating surface of the seal ring or ball seal washer seat preferably conform to a spherical surface equal to or perhaps 1% greater than the radius of the ball. As a result, the friction drag on the ball 114 attributable to the seat/ball interface is considerably decreased, but the sealing function is maintained or better. The shaped surface or grooves can be all concentric to the center of the seal ring or ball seal washer seat or can be helically spiraled like a screw thread. Moreover, the inlet or upstream ball seal washer seat 110 may be similarly configured.

Preferably, the embodiments of the present disclosure may be configured to avoid damage to the valve 100 or ball seal washer seats 110, 112 when the ball flow opening or aperture 116 is in a closed orientation as a result of hydrostatic expansion of warming trapped liquid or fluid located between the inlet and outlet ball seal washer seats 110, 112, either within the ball 114 or the body cavity 155.

In one embodiment of the present disclosure, as shown in FIGS. 2A, 4A, 5A and 6A, the inlet and outlet seal rings or ball seal washer seats 110, 112 are disposed in a fixed orientation within the bore 103 a preferable distance apart so that when there is zero flow and zero pressure difference present in the system there is a slight distance or gap 120 between the ball 114 and each of the seats 110, 112 of approximately 0.005-0.025 inches such that the ball exists non-moving between the two seats 110, 112 and a distance between the upstream and downstream seats 110, 112 through a center of the ball 114 is greater than an outer diameter of the ball 114. However, when the slightest flow or pressure difference (i.e., between upstream and downstream pressures) is present the ball 114 will move to the lower pressure, which is usually in the direction of the flow path 142, in which case the ball 114 will seal against the downstream seat and the gap 120 between the ball and the upstream seat 110 would be approximately 0.010-0.050 inches. For example, upstream pressure is 100 psig and downstream pressure is 50 psig, the ball 114 will be moved by the upstream pressure to seal on the downstream seat. In other words, when the valve 100 is installed and the system is operating, the ball 114 will always be sealing on either the downstream or the upstream seat. 112, 110. The ball orientation will be determined by a feedback signal from an actuator or manually from a directional handle on the valve 100. Whether the ball 114 is sealing on the upstream or downstream seat 110, 112 can only be determined by a transducer or temperature sensor.

In this embodiment, the pressure of the liquid or fluid in the direction of flow 142 may move the ball 114 into contact with the downstream seat 112 if the pressure is great enough. If adequate clearance is not provided, it is quite possible for the volume of liquid or fluid within the ball 114 and surrounding body cavity 155 to be totally confined when in the ball 114 is disposed in the closed orientation and become damaged by temperature expansion of liquids or fluid therein. However, such a disadvantage is not experienced in this embodiment, because the ball 114 engages only one of the upstream and downstream seats 110, 112 when disposed in the closed position and a pressure differential is defined between the upstream seat 110 and the downstream seat 112 so that there is an increased gap 120 between the ball that the other of the upstream or downstream seats 110, 112. Accordingly, in the event that there is an increase in liquid or fluid pressure within the ball 114 or the body cavity 155 (as described herein), since the ball 114 and the body cavity 155 are in communication with the inlet opening 111 through the gap 120, such pressure increase is accommodated and stabilized by the upstream liquid or fluid. Sealing in the closed position occurs as the ball 114 is pushed by the pressure of the liquid or fluid against the ball 114 against only one of the seal rings or ball seal washer seats 110, 112, which is usually the downstream side 112 because the pressure on the upstream side adjacent the upstream seat 110 or inlet opening 111 is usually greater than in the downstream or discharge piping 106. However, it is within the teachings of the present disclosure that in the event that the opposite pressure differential exists (i.e., the pressure adjacent the downstream seat 112 or outlet opening 113 is greater than the pressure of the liquid or fluid within the ball 114 or adjacent the upstream seat 110 or inlet opening 111) then the ball 114 will be moved into contact with the upstream seat 110 to for a seal when the ball 114 is in the closed position.

In another embodiment, as also shown in FIGS. 2B, 4B, 5B and 6B, the upstream seal ring or ball valve washer seat 110 may include a biasing device 118 that pushes against the piping connection 106 and moves the seal ring or ball valve washer seat 110 into contact against the ball 114 by a light force canted coil-spring, a spiral flat leafed spring, hollow metallic O-ring, or by other suitable mechanical means to define a gap 122 between the piping connection 106 and the upstream seal ring or ball valve washer seat 110 in normal operation. In the event that there is an increase in liquid or fluid pressure within the ball 114 or the body cavity 155 (as described herein) so that such liquid or fluid pressure is greater than the pressure of the liquid or fluid in the piping connection 106 adjacent the inlet opening 111 when the ball 114 is disposed in the closed position, such pressure will overcome the force of the biasing device 118 such that the upstream seal ring or ball valve washer seat 110 will intermittently disengage from the ball and be disposed at the slight distance or gap 120 from the ball 114 for the advantages described above until the pressures equalize. When the ball 114 is disposed in the closed position and the upstream seat 110 disengages a distance between the upstream and downstream seats 110, 122 through a center of the ball 114 is greater than an outer diameter of the ball 114. For the moveable ball washer seat 110 to prevent flow around its periphery, clearance space 156 within the smooth body bore 158, a lubricated O-ring or quad ring or similar sliding seal 157 is located in a groove 159 on the circumference of the ball seal washer seat 110 to engage the bore 103.

Another advantage of the ball valve 100 of the present disclosure is a stem platform 124 that is convertible from a manual operating configuration with lock-out tag-out functionality, as shown in FIGS. 1, 2 and 5, to or from an electric, hydraulic or pneumatic motor actuator configuration, as shown in FIG. 8, that may facilitate ball 114 rotation between open and closed orientations. Preferably, the handle 108 may be connected to the stem platform 124 by appropriate fasteners 126, such as threaded fasteners which engaged threaded apertures 128, that incorporate provisions to implement the lock-out/tag-out functionality and may include a face seal 130 which can be relatively loose to reduce friction during rotation, but may be squeezed by the fasteners 126, which may be configured as thumb screws, for greater sealing tightness or effectiveness, as well as fixing or securing the handle 108 into a definite rotational position, orientation or alignment. The fasteners may include holes in a grasping section which may be tied together with a wire cable and lock to create a safe tag-out, lock-out feature for tamper prevention. The seat sealing configurations described herein result in considerably lower pressure, and the resultant friction, on the seats such that much less torque is required either manually or from an automated device (i.e., electrical, hydraulic or pneumatic, etc.). For example, applicant has tested the valve described in the present disclosure in both 1" and 2" valves in a closed position with 450 psi at the inlet opening, and the operating torque is less than 200 inch-pounds. Nevertheless, such valves were also tested for sealing characteristics and at 5 psi a near-zero shut-off leakage was observed.

In one embodiment, as shown in FIGS. 2, 5 and 7, an advantageous operating stem packing configuration permits seals 132 to be replaced from the exterior without leakage from the stem region, and creating a rotary seal which has a long-life self-lubricating characteristic. For both motor actuated or handle-operated valves it is necessary to have a stem packing design which will remain tight during many thousands of cycles. The packing must be replaceable if leakage starts to occur, but in most prior art cases this requires isolation of the ball valve from the internal fluid piping system to prevent leakage to the atmosphere during the packing replacement procedure. In one embodiment of the present disclosure, a shoulder 134 at the bottom of the stem 136 seals in a manner sufficiently leak tight to permit seals 132 to be replaced at the top end of the stem 136.

Figure 14B:
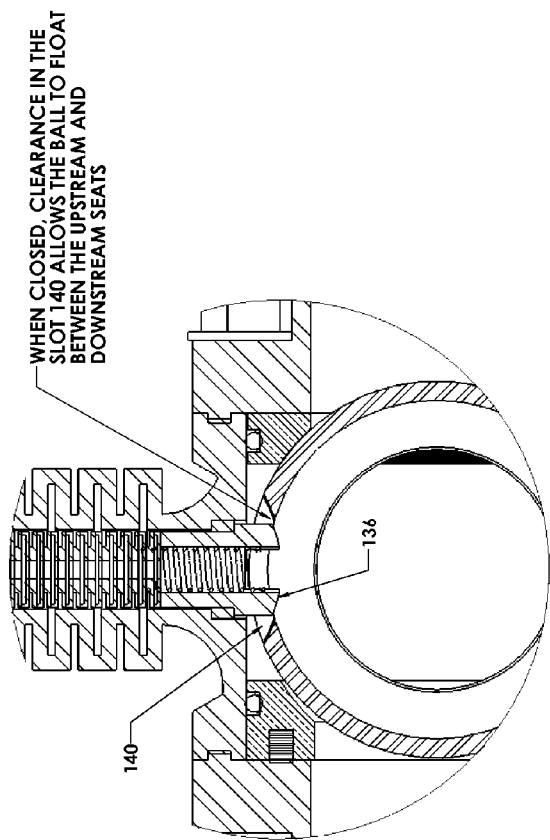
FIG. 14B illustrates an enlarged detail view of a portion of the stem and ball interface of FIG. 14A highlighted in FIG. 14A.
Figure 14A:
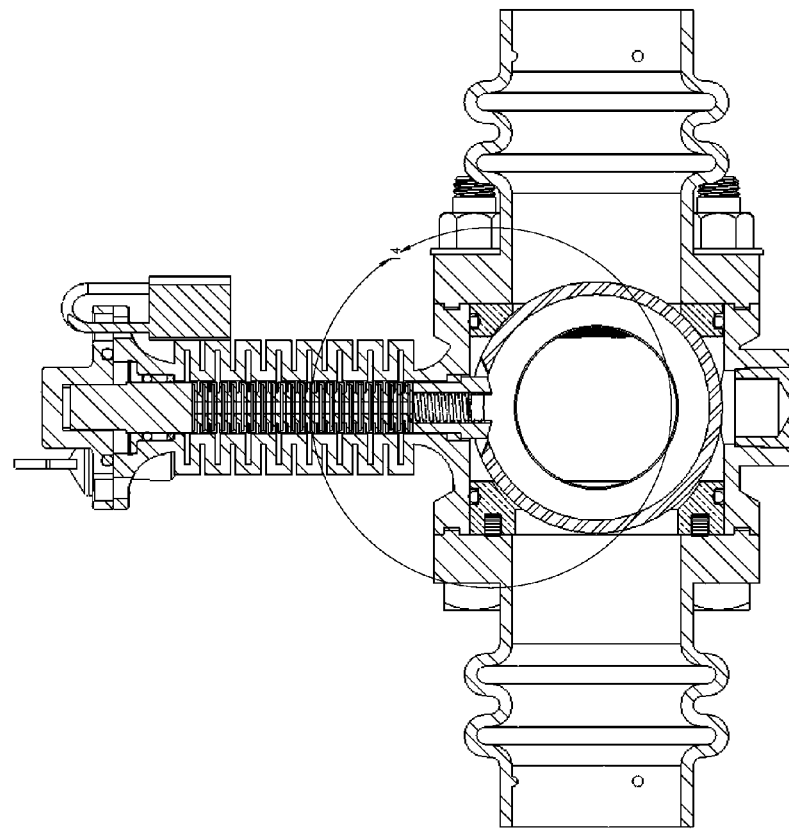
FIG. 14A illustrates an embodiment of the ball valve of FIGS. 1, 2B, and 5B.

The operating stem 136 for rotation of the ball 114 is preferably located vertically above the ball 114 to which it is rotationally connected by a rectangular protruding section in the bottom of the stem 136 which fits into a slot 140 in the ball 114 orientated typically across the direction of flow 142 through the ball aperture 116. It is within the teachings of the present disclosure that a clearance may be provided between the stem protrusion and the slot 140 in the ball 114, so that the pressure differential will facilitate a sealing engagement between the ball 114 and one of the upstream and downstream seats 110, 112 (see, FIG. 14). Because the stem 136 is fairly long, typically 5" to 20", the stem 136 is equipped with low friction supporting bearings 138 at the top and the bottom of the stem 136 to reduce rotation friction caused by tipping forces exerted on the stem 136 by the operating mechanism at the stem platform 124 and by the ball 114 friction at the bottom of the stem 136 (i.e., with respect to the seal rings or ball seal washer seats 110, 112). Consequently, the stem housing or bonnet 104 does not directly support the stem 136. The bearings 138 are supported by the stem housing 104 at the top and bottom of the stem 136. The inner diameter of the stem housing 104 is critical for castings in that it must allow clearance for the stem to rotate, but be as small as possible to minimize material and costs. The desired range of clearance values between the stem housing 104 and the stem 136 is 0.020-0.040 inches radially.

The top portion of the stem 136 is redundantly sealed by a seal assembly including seal rings 132, namely, O-rings and quad-rings, to prevent leakage from or to the valve body 100 interior. These seal rings 132 are retained by a flat bushing 144 held in place by a retaining ring 146, such as "spiralock." These rings 132 can be replaced while the valve body 100 is pressurized because the bottom of the stem 136 has a shoulder 134 having an outer diameter that is greater than an inner diameter of the stem housing 104 so as to sealingly engage and seat against the valve body stem housing 104 low end shoulder which provides a smooth matching surface. The stem 136 may be held in a sealing manner against the surface by a biasing element or spring 148 pushing upon the top of the ball 114. While thus sealed, the upper seal assembly can be removed by a wire hook and replaced with new seals.

Another objective is to better control heat and condensation freezing commonly associated with the installation and operation of similar valves, especially in the field of refrigeration applications. In one embodiment, as shown in FIGS. 2, 5 and 7, valve 100 piping connections 106 may be configured from a relatively thin-walled investment casting that includes a corrugated section, thereby keeping the red-hot heat of pipe connection welding process from reaching the valve body 102 interior and its plastic or rubber components. It is within the teachings of the present disclosure that such a corrugated section increases the heat transfer path or distance between the welded connection and the plastic or rubber components sufficiently to eliminate damage thereto.

In another embodiment, the valve stem bonnet or housing 104, neck and pipe connection can be configured to greatly reduce longitudinal heat flow from the ambient surroundings to the valve interior by including at least interior and exterior surface configurations that may be generally formed by short, zigzag heat paths or a corrugated surface configuration rather than long, thin wall tubular sections, thereby eliminating excessively long neck sections protruding through the pipe and valve insulating material jacket as commonly found in conventional installations.

The body 102 of the ball valve 100 has stem housing or bonnet 104 cast as an integral portion that may include a corrugated exterior and/or interior surface configuration to reduce vertical conductive heat transfer into the ball valve 100 and also prevent condensation or frost at the stem seals 132. The corrugated surfaces may be formed by casting, machining or other conventional forming. In order to achieve a lengthy but safety captured stem 136, a threaded hole 150 is located at the bottom of the valve body 102 for insertion of the lengthy stem 136 prior to the installation of the ball 114 and its two seal rings or ball seal washer seats 110, 112.

The bonnet or housing 104 which houses the stem 136 can have as thin a wall section as possible or as an alternate provided aided by modern investment casting technique have a long relatively thin walled bellows like or corrugated construction 154. The exterior groves can be left open or filled with low heat transfer material such as plastic or grease in order to prevent the grooves from filling with highly conductive ice.

Figure 17:
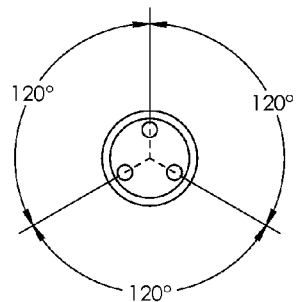
FIGS. 15-17 illustrate various views of another embodiment of the stem for a ball valve of the present disclosure.
Figure 16:
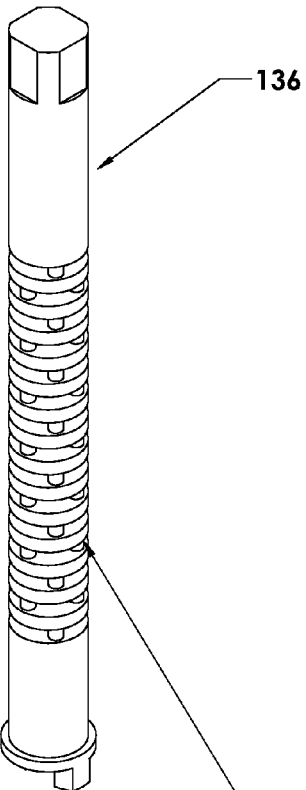
Figure 15:
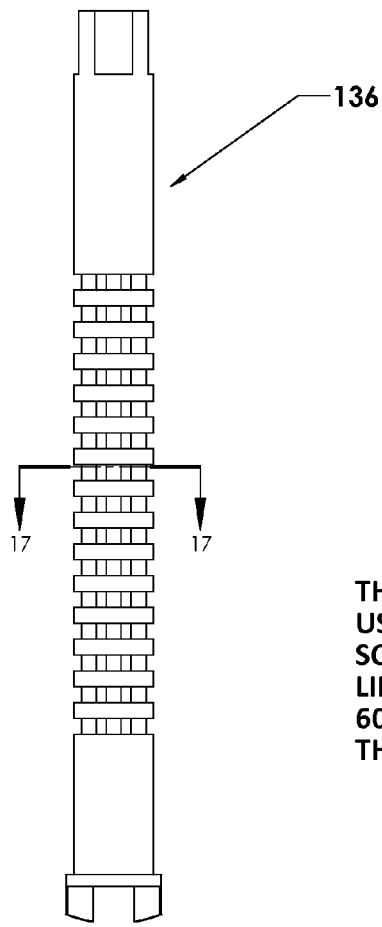
Figure 18:
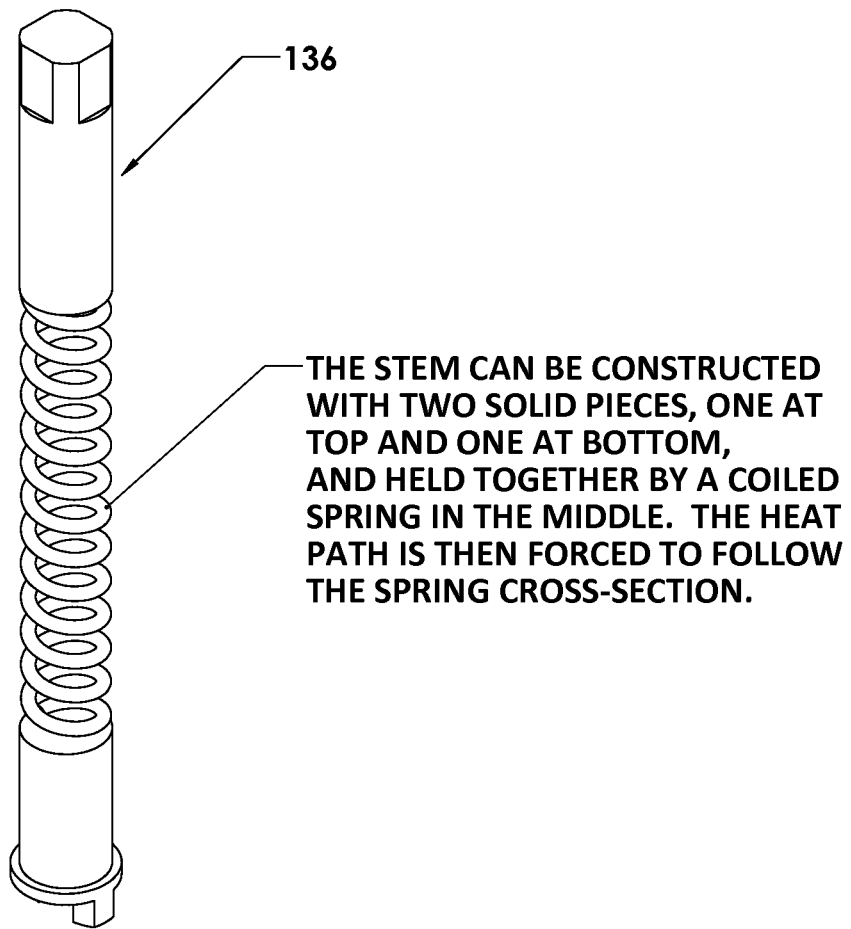
FIG. 18 illustrates a perspective views of another embodiment of the stem for a ball valve of the present disclosure.
Figure 22:
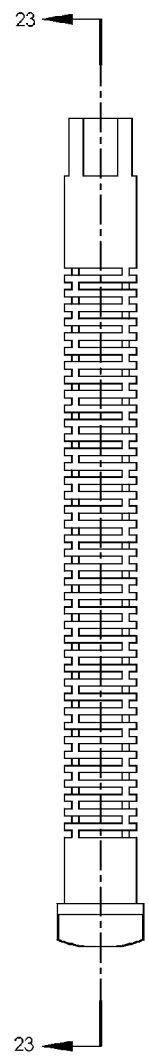
FIGS. 22-24 illustrate various views of another embodiment of the stem for a ball valve of the present disclosure.
Figure 23:
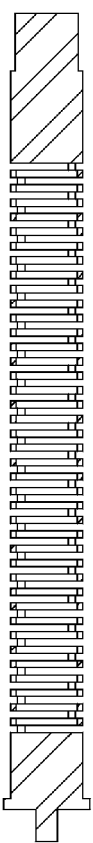
Figure 24:
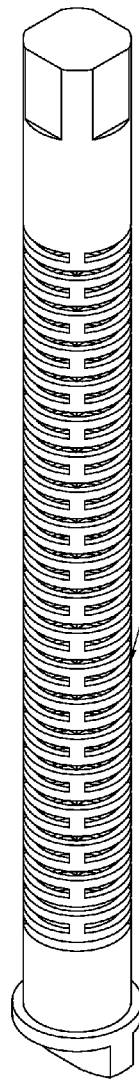

In order to reduce heat transfer through the stem 136 itself, a portion of the length of the stem 136 may have its cross sectional area greatly reduced by fabricating the stem 136 with a series of square or round or oblong cross sections 152 by means of machined or otherwise fabricated slots about 50%-85% through the stem 136 on alternate sides like a ladder, where about 75% through the stem 136 has found to be advantageous. This greatly lengthens the heat path while keeping the heat transfer cross sectional area relatively small. There remains enough horizontal cross sectional area to provide adequate rotational sheer strength for the required turning torque from the top of the stem 136 to the ball 114, which must exceed the stem packing configuration friction plus the friction of the bearing plus the ball surface friction on the upstream and downstream seats 110, 112. As an alternative, the same lengthy heat path can be achieved by forming the exterior surface with a corrugated configuration, welding, soldering or brazing a series of zig-zag washers or individual discs with two or more equal height protrusions that are in soldered contact with a similarly oriented adjacent disc, configuring a portion as a spring (either coiled or machined) (see, FIG. 18 as an example of a coiled spring), using three rods soldered or welded to a plate creating layers for the length of the stem (see, FIGS. 15-17), forming a series of cuts perpendicular to adjacent cuts creating a step pattern throughout the length (see, FIGS. 19-20), machining a series of cuts into a portion of the stem 136 that are perpendicular to each other creating a step pattern similar to one embodiment of a machined spring (see, FIGS. 22-24), or bonding metallic and insulating components together in the same manner as described above.

The piping connection 106 for the ball valve can be the usual bolted flanges for pipe welding connections or by constructing the valve body 102 with corrugated or bellows like inlet and outlet ends which will permit the terminations of the valve to be welded directly to piping without damage to the internal plastic seal rings 110, 112 because the heat path length of the corrugation valve end is sufficiently long to keep the body relatively cool despite the red hot welding process at the pipe junctions.

As shown in FIGS. 12, 13 and 25, a ball 114 flow opening 116 may be configured for a more suitable flow modulation than mere vertical segments of a circle, as is common in the prior art. The ball opening 116 can be a specially contoured opening defined by a periphery to commence with a thin slot located on the bottom segment of the downstream seat 112, for example in the range of approximately about 0.001 to 0.100 inches width for certain refrigeration applications (see, FIGS. 12 and 13). Similarly, the specially contoured opening may commence at the equator of the ball 114 and grow or expand identically in a mirror like fashion above and below the equator to a desired contour (see, FIG. 25). It is within the teachings of the present disclosure that configuration of the slot opening may be tailored to any specific application, liquid or fluid, especially where it may be more advantageous to dispose the initial slot opening in a liquid or gas region when both such fluids are present in the same pipe or valve. The opening 116 may be a singular opening in the ball that is defined over more than 90 degrees of a circumference of the ball. In one embodiment, the flow opening 116 is defined by a periphery that is configured such that a lower area of the flow opening 116, which is cooperatively defined by an equator of the ball 114 and the periphery disposed below the equator, is greater than an upper area of the flow opening 116, which is cooperatively defined by the equator and the periphery disposed above the equator. In another embodiment, the flow opening is initially minimally revealed to define the flow path and then becomes approximately about fifty percent of the circular ball hole opening when rotated the typical 90 degrees from closed. In another embodiment, the flow opening 116 that is defined by the periphery is configured such that approximately 25% of the lower area, as defined above, is exposed or revealed when the ball is moved from the closed position to the open position to define the flow path through the ball 114 before any of the upper area, as defined above, is exposed or revealed.

Furthermore, the single active sealing surface of the present disclosure also permits a more extended slot, which is operative over a circumferential rotation of up to 240 degrees, and yet still retaining enough solid ball surface for total sealing of flow when the solid ball surface is positioned over the existing seal washer. Since only one surface of the ball is used for sealing (the downstream seat 112) it is possible to create a teardrop like ball opening as much as 240 degrees of the balls' circumference, thus providing much greater flow control rangeability whether operated manually or via a motor operator.

This disclosed device operates at a much lower turning torque due to seal and packing designs compared to existing ball valve designs, thus allowing its motor actuator to be smaller and faster. Summarizing the key aspects of this disclosure: seats further apart than ball diameter; seal rings having grooves; inlet seat positioned by canted spring; long stem inserted from bottom of body; corrugated vertical stem housing bonnet sections; corrugated welding end sections; zig-zag valve stem design; low friction stem seal design repairable under pressure; 240 degree ball aperture design having V point starting at bottom edge of ball aperture.

The above detailed description and the examples described therein have been presented for the purposes of illustration and description only and not by limitation. It is therefore contemplated that the present disclosure cover any and all modifications, variations or equivalents that fall within the spirit and scope of the basic underlying principles disclosed above and claimed herein.

The invention claimed is:

1. A valve comprising:
a body including a bore, an upstream seat disposed within the bore that defines an inlet opening, a downstream seat disposed within the bore that defines an outlet opening, and a ball having a flow opening and disposed within the bore between the upstream and downstream seats, wherein the ball is movable within the body between a closed position and an open position, such that a flow path is defined through the body only when the ball is disposed in the open position, and when the ball is disposed in the closed position the upstream seat intermittently disengages from the ball when a pressure within the ball is greater than a pressure within the inlet opening outside the ball; and wherein the upstream and downstream seats each include a sealing surface having a concave partially spherical contour and one of the sealing surfaces has a crenulate configuration formed therein.

2. The valve of claim 1, wherein a distance between the upstream and downstream seats through a center of the ball is greater than an outer diameter of the ball, when the ball is disposed in the closed position and the upstream seat disengages from the ball.

3. The valve of claim 1, wherein the flow opening is a singular opening in the ball and said flow opening is defined over more than 90° of a circumference of the ball.

4. The valve of claim 1, wherein the flow opening is defined by a periphery that is configured such that a lower area of the flow opening, cooperatively defined by an equator of the ball and the periphery disposed below the equator, is greater than an upper area of the flow opening, cooperatively defined by the equator and the periphery above the equator.

5. The valve of claim 1, wherein the flow opening is defined by a periphery that is configured such that approximately 25% of a lower area of the flow opening defined below an equator of the ball is exposed when the ball is moved from the closed position to the open position to define a flow path through the ball before any of an upper area of the flow opening defined above the equator of the ball is exposed.

6. The valve of claim 1, further comprising a stem housing connected to the body, the stem housing having a corrugated exterior surface configuration and a corrugated interior surface configuration.

7. The valve of claim 1, further comprising a piping connection connected to the body adjacent one of the inlet and outlet openings, the piping connection including a wall having a corrugated configuration.

8. The valve of claim 1, wherein the crenulate configuration is defined by a series of truncated peaks and a valleys.

9. The valve of claim 8, wherein the series of truncated peaks and the valleys are selected from a group consisting of independently formed truncated peaks and valleys and a single continuous spiraling truncated peak and valley.

10. The valve of claim 1, further comprising a stem housing coupled to the body and a stem disposed within the stem housing that engages the ball, the stem including a shoulder having an outer diameter greater than an inner diameter of the stem housing that is disposed adjacent the ball to sealingly engage the stem housing.

11. The valve of claim 10, wherein a biasing element is disposed between the ball and the stem that biases the stem into sealing engagement with the stem housing.

12. The valve of claim 10, wherein the stem housing further comprises a seal assembly disposed therein and about an end portion of the stem opposite the ball, the seal assembly including a seal ring, a bushing, and a retaining ring such that the seal ring is replaceable when a pressure is present within the body.

13. The valve of claim 10, wherein a biasing element is disposed between the ball and the stem that biases the stem into sealing engagement with the stem housing.

14. The valve of claim 10, wherein the stem housing further comprises a seal assembly disposed therein and about an end portion of the stem opposite the ball, the seal assembly including a seal ring, a bushing, and a retaining ring such that the seal ring is replaceable when a pressure is present within the body.

15. The valve of claim 1, wherein the body further includes a stem that engages the ball, the stem including a portion having a reduced cross sectional area configuration.

16. The valve of claim 15, wherein the reduced cross sectional area configuration is defined in a middle portion of the stem that is disposed between a first end portion disposed adjacent the ball and an opposed second end portion.

17. The valve of claim 15, wherein the reduced cross sectional area configuration is selected from a group consisting of a corrugated exterior surface, a series of longitudinally alternating grooves, a series of connected discs, a spring, and a series of longitudinally spirally offset grooves.

18. A valve comprising:
a body including a bore, an upstream seat disposed within the bore that defines an inlet opening, a downstream seat disposed within the bore that defines an outlet opening, and a ball having a flow opening and disposed within the bore between the upstream and downstream seats; wherein the ball is movable within the body between a closed position and an open position such that a flow path is defined through the body only when the ball is disposed in the open position; wherein a distance between the upstream and downstream seats through a center of the ball is greater than an outer diameter of the ball, wherein the ball engages only one of the upstream and downstream seats when disposed in the closed position and a pressure differential is defined between the upstream seat and the downstream seat; and wherein the upstream and downstream seats each include a sealing surface having a concave partially spherical contour and one of the sealing surfaces has a crenulate configuration formed therein.

19. The valve of claim 18, wherein the ball engages either the upstream or the downstream seat but never both upstream and downstream seats simultaneously when the ball is disposed in the open position.

20. The valve of claim 18, wherein the flow opening is a singular opening in the ball and said flow opening is defined over more than 90° of a circumference of the ball.

21. The valve of claim 18, wherein the flow opening is defined by a periphery that is configured such that a lower area of the flow opening, cooperatively defined by an equator of the ball and the periphery disposed below the equator, is greater than an upper area of the flow opening, cooperatively defined by the equator and the periphery above the equator.

22. The valve of claim 18, wherein the flow opening is defined by a periphery that is configured such that approximately 25% of a lower area of the flow opening defined below an equator of the ball is exposed when the ball is moved from the closed position to the open position to define a flow path through the ball before any of an upper area of the flow opening defined above the equator of the ball is exposed.

23. The valve of claim 18, further comprising a stem housing connected to the body, the stem housing having a corrugated exterior surface configuration and a corrugated interior surface configuration.

24. The valve of claim 18, further comprising a stem housing coupled to the body and a stem disposed within the stem housing that engages the ball, the stem including a shoulder having an outer diameter greater than an inner diameter of the stem housing that is disposed adjacent the ball to sealingly engage the stem housing.

25. The valve of claim 18, further comprising a piping connection connected to the body adjacent one of the inlet and outlet openings, the piping connection including a wall having a corrugated configuration.

26. The valve of claim 18, wherein the crenulate configuration is defined by a series of truncated peaks and a valleys.

27. The valve of claim 26, wherein the series of truncated peaks and the valleys are selected from a group consisting of independently formed truncated peaks and valleys and a single continuous spiraling truncated peak and valley.

28. The valve of claim 18, wherein the body further includes a stem that engages the ball, the stem including a portion having a reduced cross sectional area configuration.

29. The valve of claim 28, wherein the reduced cross sectional area configuration is defined in a middle portion of the stem that is disposed between a first end portion disposed adjacent the ball and an opposed second end portion.

30. The valve of claim 28, wherein the reduced cross sectional area configuration is selected from a group consisting of a corrugated exterior surface, a series of longitudinally alternating grooves, a series of connected discs, a spring, and a series of longitudinally spirally offset grooves.

* * * * *